(12) United States Patent
Vaughn (10) Patent No.: US 10,112,308 B2
(45) Date of Patent: Oct. 30, 2018

(54) VACUUM CUP ASSEMBLY

(71) Applicant: Wolfram Labs, LLC, Groveport, OH (US)

(72) Inventor: Joel Michael Vaughn, Groveport, OH (US)

(73) Assignee: Wolfram Labs, LLC, Groveport, OH (US)

( * ) Notice: Subject to any disclaimer, the term of this patent is extended or adjusted under 35 U.S.C. 154(b) by 0 days.

(21) Appl. No.: 15/817,733

(22) Filed: Nov. 20, 2017

(65) Prior Publication Data

US 2018/0071922 A1 Mar. 15, 2018

Related U.S. Application Data

(63) Continuation of application No. 14/942,343, filed on Nov. 16, 2015, now Pat. No. 9,833,909.

(60) Provisional application No. 62/080,361, filed on Nov. 16, 2014.

(51) Int. Cl.
   *B25J 15/06* (2006.01)
(52) U.S. Cl.
   CPC ....... *B25J 15/0616* (2013.01); *B25J 15/0625* (2013.01)

(58) Field of Classification Search
   CPC ................ B25J 15/0616; B25J 15/0625; B25J 15/0641; B66C 1/02; B66C 1/0256; B66C 1/0275
   USPC ......................................... 294/183, 185, 187
   See application file for complete search history.

(56) References Cited

U.S. PATENT DOCUMENTS

| | | |
|---|---|---|
| 2,247,787 A | 7/1941 | Schmidt |
| 4,026,591 A | 5/1977 | Cleaveland |
| 7,086,675 B2 | 8/2006 | Jacobs |
| 9,108,319 B2 | 8/2015 | Kniss et al. |
| 2009/0263263 A1 | 10/2009 | Wu |
| 2014/0105717 A1 | 4/2014 | Looi et al. |

*Primary Examiner* — Gabriela M Puig
(74) *Attorney, Agent, or Firm* — Jason H. Foster; Kremblas & Foster (57) ABSTRACT

A vacuum cup assembly that generates a local vacuum using a prime mover that may be an electrical motor or a solenoid. The vacuum cup may have one or more ports to remove and vent air between the cup and the atmosphere. The prime mover drives a piston or a flexible membrane, which may be a diaphragm, through one or more reciprocating cycles to generate the local vacuum. The vacuum cup assembly may be used to form a temporary attachment to a work piece, the act on the work piece, such as by moving the work piece, and then release the work piece from the vacuum cup assembly. The vacuum cup assembly disclosed herein is self-contained inasmuch as the assembly may have a power source, such as a battery, located on a housing. This makes its operation quiet and effective.

20 Claims, 10 Drawing Sheets

VACUUM CUP ASSEMBLY

CROSS-REFERENCES TO RELATED APPLICATIONS

This application is a continuation of U.S. patent application Ser. No. 14/942,343, filed Nov. 16, 2015, now U.S. Pat. No. 9,833,909, which claims the benefit of U.S. Provisional Application No. 62/080,361 filed Nov. 16, 2014. These prior applications are hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The present invention relates generally to the field of automation systems, and more specifically to vacuum cup assemblies that create a temporary mechanical attachment to an object in order to permit equipment to lift such objects in order to move them.

Many vacuum cup assemblies on the market are venturi-operated, which require an air flow to generate a vacuum via a venturi effect. Thus, each assembly must have a source of compressed air or must be connected to a vacuum source, both of which typically occur through gas hoses.

The use of compressed air may be too noisy for certain environments, because the operation of numerous venturi-operated cup assemblies can damage human auditory systems. Furthermore, in many applications, the use of venturi-operated cup assemblies can move sufficient air to cause small particles to become contaminants in medical and electronic products near which the cup assemblies are operated. Furthermore, compressed air systems require significant maintenance. Still further, some users of cup assemblies may not be willing or able to extend an air hose to an assembly.

The prior art includes devices that deform suction cups, such as the conventional suction cup used to mount electronic and other devices to automotive windows. However, such mechanisms do not provide satisfactory results in some circumstances. Furthermore, because some users wish to use their own proprietary cup, such conventional suction cups do not suffice. Such deformable cups may also lack a continual vacuum draw, which is sometimes desired.

Therefore, there is a need for a vacuum cup system in a quiet and clean working environment.

BRIEF SUMMARY OF THE INVENTION

Disclosed herein is a vacuum cup assembly having a vacuum cup with a wall terminating at one end in a rim configured to seat against a work piece for forming a temporary attachment to the work piece. The vacuum cup has a concave fluid chamber formed within the vacuum cup wall. The vacuum cup is mounted to the housing, such as to a first wall of the housing. In a preferred embodiment, a second housing wall has a cylindrical bore therein, which at least partially defines a variable volume chamber that is fluidically connected to the concave fluid chamber in the vacuum cup. A sidewall, which may be a piston or a flexible membrane, is moveably mounted to the housing wall and partially defines the variable volume chamber. A prime mover, which may be a rotary motor or a solenoid, is mounted to the housing and to the sidewall, and may selectively displace the sidewall relative to the housing, such as by a linkage connecting the prime mover and the sidewall. Displacement of the sidewall modifies the volume of the variable volume chamber and thereby modifies the fluid pressure in the concave fluid chamber.

The piston may be sealingly and slidably mounted in the cylindrical bore of the housing wall. As an alternative, the sidewall may be a flexible membrane sealingly mounted to the housing wall in the cylindrical bore. Both sidewalls form a boundary of the variable volume chamber.

One or more valves may be mounted in the sidewall, in the housing, or in both the sidewall and the housing to permit fluid to flow through the valve from the variable volume chamber. This valve can selectively pass air into the variable volume chamber from the atmosphere, out of the variable volume chamber to the atmosphere or to the internal regions of the housing.

In one aspect, a vacuum cup assembly may comprise a housing having a chamber including a cylinder wall, wherein a linear or rotary prime mover, such as a motor or solenoid, moves a piston in the chamber. The prime mover may mount to the housing, and the housing may have an opening at one side or the housing may comprise a base to which the prime mover mounts. The housing may have a base and an aperture through the base on the side of the housing opposite the motor. A passage through the base extends into the vacuum cup.

In another aspect, a vacuum cup assembly may comprise a housing having a chamber including a cylinder wall, wherein the housing has an opening at one side where a solenoid moves a piston in the chamber. The housing may have a base and an aperture through the base on the side of the housing opposite the solenoid, and it is contemplated for the solenoid or motor to be mounted to the housing adjacent the aperture and base or on the same side of the housing as the aperture and base. A passage through the base extends into the vacuum cup.

In another aspect, a vacuum cup assembly comprises a housing having a chamber, wherein the housing has an opening at one side where an electrical motor connects to and may move a diaphragm in the chamber. The housing may have a base and an aperture through the base on the side of the housing opposite the motor.

In another aspect, a vacuum cup assembly comprises a housing having a chamber, wherein the housing has an opening at one side where a solenoid connects to and may move a diaphragm in the chamber. The housing may have a base and an aperture through the base on the side of the housing opposite the motor.

The embodiments of the present invention provide a vacuum cup assembly or system of providing suction force to pick up a work piece, which is not limited to any size, shape, weight or useful purpose, and then release the work piece with precision. The vacuum cup assembly may have a power source that is located on the vacuum cup assembly, thereby avoiding the need for connecting wires, air hoses or any other structure to power the vacuum cup assembly. The power source may be batteries or any electrical, chemical, mechanical or other energy or potential energy storage device. The above, and other, features, aspects and advantages of the present invention will become better understood with reference to the following drawings, description and claims.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 62/080,361 filed Nov. 16, 2014, which is the above claimed priority application, is herein incorporated in this application by reference. The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Various inventive features are described below that can each be used independently of one another or in combination with other features.

Figure 1:
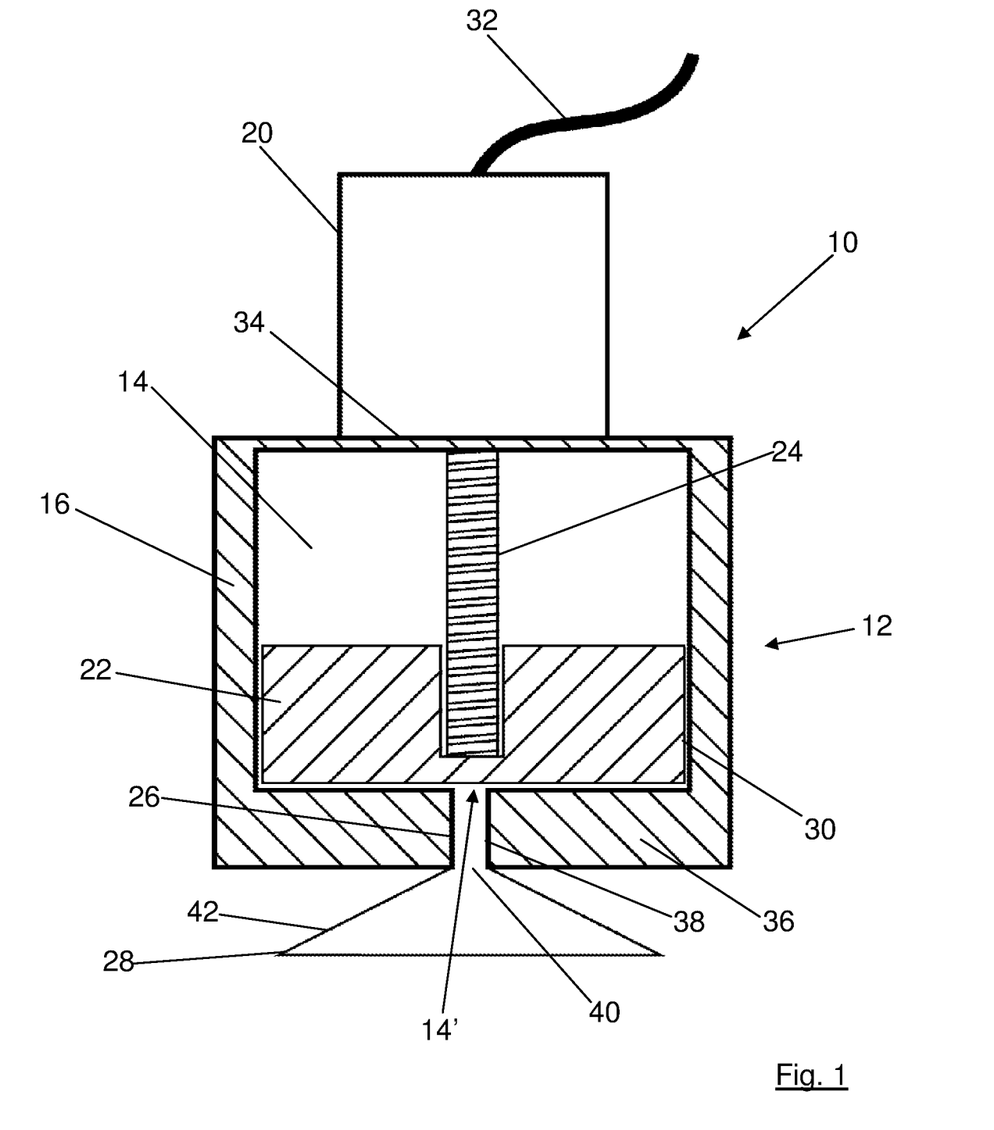
FIG. 1 is a cross-sectional view illustrating a vacuum cup assembly in accordance with an embodiment of the present invention.

Referring to FIG. 1, a vacuum cup assembly 10 may include a housing 12 having a chamber 14 that may be defined by a wall 16. The wall 16 may be cylindrical, which includes at least circular cylindrical, square cylindrical, or any other cylindrical shape, and may have one or more walls forming the housing 12. Alternatively, the housing may have a planar wall, such as a plate (see FIG. 7). The housing 12 may have a wall 34 at a first side to which a prime mover, which may be an electrical motor, a solenoid 20 or any other device that imparts rotary or linear force, may attach and through which a linkage 24 may extend to drivingly link the solenoid 20 to a piston 22. The electric motor or solenoid 20 may include a connection 32 to an AC or DC electrical source if they are electrically powered, and the source may be mounted to the housing 12. The electric motor may be rotary or linear, and the solenoid may be rotary or linear.

The piston 22 may be sealingly mounted in the chamber 14, such as by a close-tolerance fit to the sidewall's radially inwardly-facing surface, and the piston 22 may include a seal 30, such as an O-ring or other gas-sealing structure, at the radially outwardly-facing peripheral edge of the piston 22. The piston 22 thus forms a sidewall defining at least a portion of a variable volume chamber between the piston 22 and the housing 12, which variable volume chamber is described in more detail below.

The housing 12 may have a wall, which may be the base 36, through which a housing aperture 38 is formed on the housing 12 opposite the wall 34. A piece of tubing 26 may be connected to, or inserted through, the housing aperture 38 and a vacuum cup 28 may be attached to the tubing 26 via a cup aperture 40. The cup aperture 40 may be at the top of the vacuum cup 28, for example, in the orientation shown in FIG. 1. The cup aperture 40 may, alternatively, be located at the walls 42 of the vacuum cup 28, and may include a plurality of apertures.

The tubing 26 may be inserted through the aperture 38, and may extend a significant distance between the vacuum cup 28 and the base 36. If the tubing 26 is rigid enough, the tubing 26 functions as an extension of the housing 12, thereby extending the vacuum cup 28 into, for example, a hollow work piece such as a box, to enable the box to be picked up from the bottom floor.

The linkage 24 may be a rigid rod, a threaded shaft (e.g., a screw), or a rack and pinion, connecting the solenoid 20 to the piston 22, depending upon the manner in which the solenoid imparts force to the piston 22. The linkage 24 preferably connects the solenoid 20 to the piston 22 to permit the solenoid 20 to move the piston 22 in one or more strokes within the bore of the housing 12. The linkage 24 may include a spring that biases the piston 22 toward the top of the chamber 14 closer to the solenoid 20, or that biases the piston 22 toward the bottom of the chamber farther away from the solenoid 20. Upon moving the piston 22 upwardly from the position shown in FIG. 1, a space is formed between the piston 22 and the base 36 that is part of the variable volume chamber within the housing 12. The solenoid 20 may, during typical operation, displace the piston 22 in one direction, there may be a pause of a fraction of a section to minutes, and then the solenoid 20 may displace the piston 22 in the opposite direction. Alternatively, the solenoid 20 may displace the piston 22 reciprocatingly without substantial pause at the end of each stroke or each cycle. This will become apparent to the person of ordinary skill from the description herein.

The vacuum cup 28 is preferably a conventional flexible vacuum cup having a lower rim that initially seats against an object that is to be lifted, and walls 42 that are sufficiently flexible to permit deformation thereof as lower pressure is created within the variable volume chamber 14'. The vacuum cup 28 may form a temporary mechanical attachment to a work piece, thereby allowing the vacuum cup 28 to readily pick up a work piece at one location and move the work piece to another location, whereupon the vacuum cup 28 releases the work piece as described herein. In the embodiment of FIG. 1, the workpiece is mechanically attached by displacing the piston 22 upwardly in the orientation of FIG. 1, and then released by displacing the piston 22 downwardly. The vacuum cup 28 may be made of silicone, rubber, latex or other polymers as an example, so that the body of the vacuum cup 28 is flexible, yet sturdy enough to hold up a work piece for a period of time.

In operation, the electric motor or solenoid 20 is powered on and the piston 22 may be lifted up in the chamber 14 to enlarge the variable volume chamber 14' that is within the housing 12 between the piston 22, which serves as a sidewall to the variable volume chamber 14', and the base 36, which is a wall of the housing 12. This enlargement decreases pressure in the variable volume chamber 14', and this lower pressure draws fluid from the housing aperture 38, the bore of the tubing 26, and the cavity of the vacuum cup 28. If the rim of the vacuum cup 28 is seated against a work piece surface, the lower pressure in the cavity of the vacuum cup 28 relative to the atmosphere outside of the assembly 10 causes the rim of the cup 28 to seal against the workpiece surface. Further reduction in pressure in the variable volume chamber 14' may cause the walls 42 to deform outwardly and upwardly, thereby causing the interiors of the walls 42 to seat against the surface of the work piece. Thus, the relatively negative pressure in the vacuum cup 28, when the lower rim of the cup 28 contacts a surface of the work piece, causes the lower rim of the cup 28 to create a suction force against the work piece. As the piston 22 is moved upwardly further, the pressure in the vacuum cup 28 cavity is further reduced to generate a temporary attachment force sufficient to pick up the work piece. The work piece is thus picked up, acted upon, such as by moving the work piece, and, upon de-activation of the solenoid 20 or reversal thereof, the negative pressure may be relieved and the work piece may be released. The negative pressure is relieved in the embodiment of FIG. 1 by displacing the piston 22 downwardly in the orientation of FIG. 1. Thus, by controlling the prime mover that may be powered by a power source contained on or within the assembly 10, the vacuum cup assembly 10 enables a user to pick up and release a work piece with precision and control and without the disadvantages of the prior art.

Described herein is an improved vacuum cup assembly having a vacuum cup 28 with a wall terminating at a lower end in a rim. The rim is configured to seat against the work piece for forming a temporary attachment to the work piece, and a concave fluid chamber is defined within the vacuum cup 28 sidewall. The vacuum cup is mounted to the housing 12, and the housing 12 at least partially defines a variable volume chamber that is fluidically connected to the concave fluid chamber in the vacuum cup 28. A sidewall, which may be a piston 22, is moveably mounted to the housing 12 and partially defines the variable volume chamber. The prime mover, which may be the solenoid 20, is mounted to the housing 12 and the piston 22, and the solenoid 20 is selectively moveable to displace the piston 22 relative to the housing 12, thereby modifying the volume of the variable volume chamber and modifying the fluid pressure in the concave fluid chamber.

Figure 2:
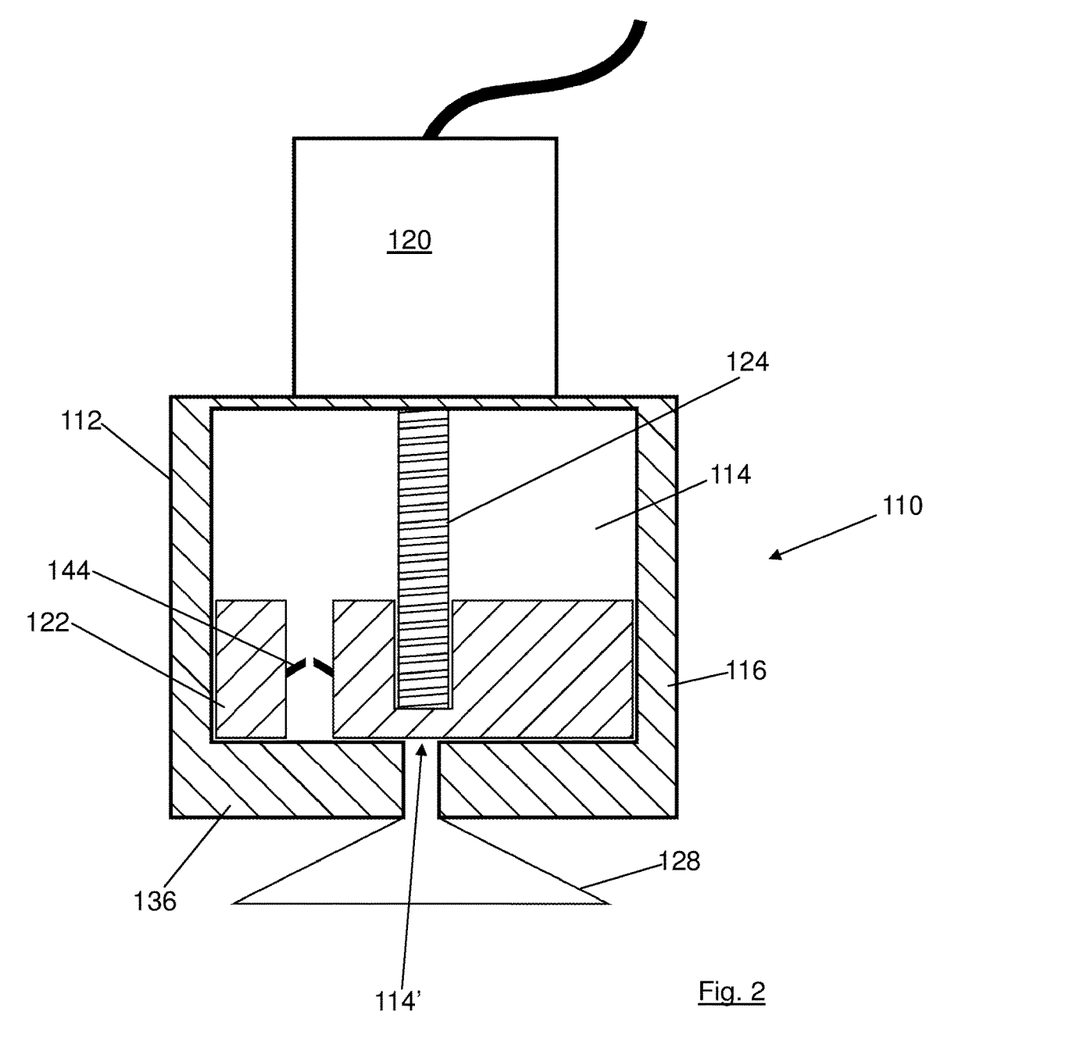
FIG. 2 is a cross-sectional view illustrating a vacuum cup assembly in accordance with an embodiment of the present invention.

As shown in the alternative cup assembly 110 of FIG. 2, the piston 122 may have a valve 144 disposed between the cup 128 and the chamber 114, which may be defined by a wall 116, within the housing 112. The valve 144 may be actuated manually or automatically in order to vent air or other gases into or out of the variable volume chamber 114' that is between the piston 122 and the base 136 of the housing 112. The valve 144 may be a one-way or "check" valve that permits gas to flow in one direction, such as out of the variable volume chamber 114', but not in the opposite direction. Alternatively, the valve 144 may be a selectively-actuated valve that may be controlled by a computer to open and close. The valve 144 enables the cup assembly 110 to generate a continuous suction at the vacuum cup if the lower rim is not sealingly seated against a surface of a work piece by to pump large volumes of gas out of the cup 128 by cyclical reciprocation of the piston 122 resulting from continuous actuation of the solenoid 120. Thus, the solenoid 120 may displace the linkage 124 in one direction to displace the piston 122 away from the vacuum cup 128, and then displace the linkage 124 in the opposite direction to displace the piston 122 toward the vacuum cup 128, and repeat this cyclically. When operating as a one-way valve out of the variable volume chamber 114', the valve 144 permits rapid, cyclical movement of the piston 122 to eject the gas drawn into the variable volume chamber 114' into the portion of the chamber 114 that does not include the variable volume chamber 114', and this portion may be vented to the atmosphere. Thus, the cup assembly 110 may be able to continuously operate the solenoid 120 until the rim of the cup 128 seals against a work piece surface and attaching temporarily thereto. At that point, the solenoid 120 can be paused, or it can continue reciprocating if sufficient additional valves are in place.

Figure 8:
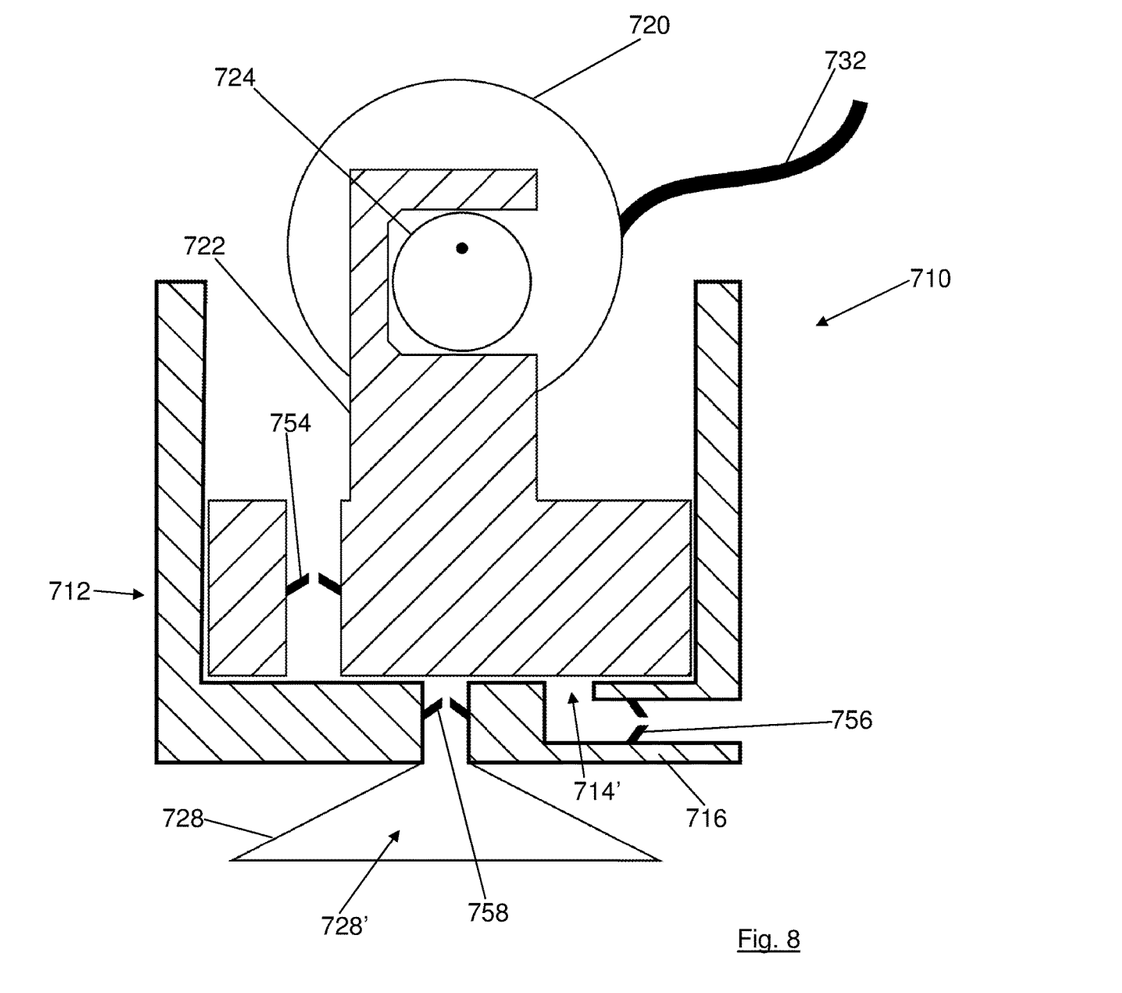
FIG. 8 is a cross-sectional view illustrating a vacuum cup assembly in accordance with an embodiment of the present invention.

In another cup assembly 710 shown in FIG. 8, in addition to the valve 754, which is equivalent to the valve 144 of FIG. 2, the housing 712 may have one or more valves 756 and 758 disposed in the wall 716 of the housing 712. The valves 754-758 may allow for air or another gas to move into or out of the spaces, such as the variable volume chamber 714', which are fluidically connected by passages that the valves 754, 756 and 758 may selectively block or open. The valves 754, 756 and 758 may be one-way valves that permit passage of gas in only one direction. Alternatively, the valves 754, 756 and 758 may be electronically controlled by a computer to permit gas to flow, selectively, in one or both directions. The valves 754, 756 and 758 may be used to release a relatively low pressure, at times referred to herein as a "vacuum", from a chamber or other portion of the cup assembly 710. The housing 712 may have one or more sensors (not shown), which may sense a location of the piston 722 or some other structure in the cup assembly 710, or may sense the pressure in the housing 712, and those sensors may be connected to send signals to a computer. The valves described herein may be physically isolated from the associated housing and/or sidewall described above, while having the same effect as a valve described and shown herein. Such valves may be, for example, disposed in a tube that fluidically connects to the housing or variable volume chamber, but are remote from the housing or variable volume chamber. Such valves are considered equivalent to those described herein. The term "fluidically connected" is defined herein to mean any connection that permits flow of a fluid (a gas or a liquid).

Figure 3:
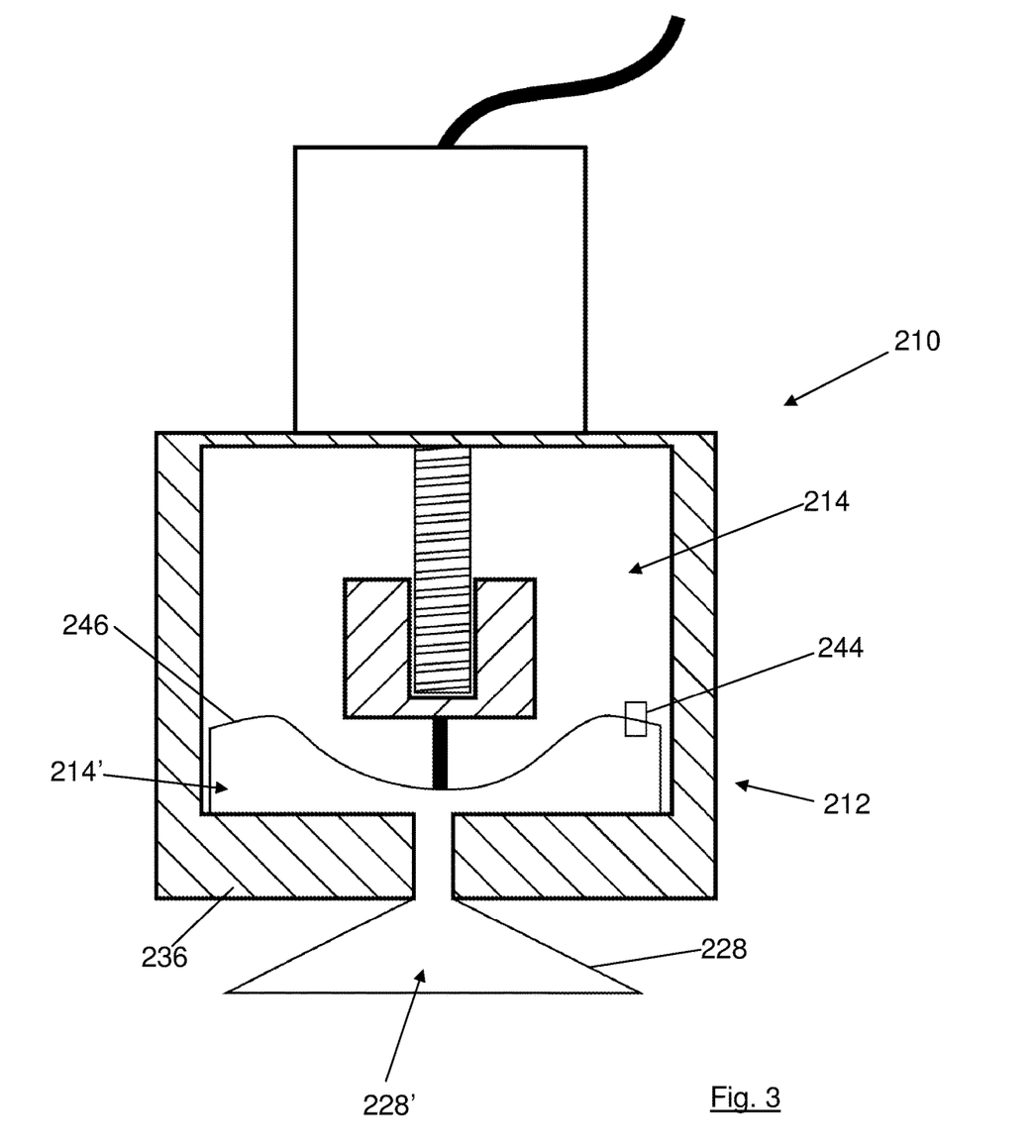
FIG. 3 is a cross-sectional view illustrating a vacuum cup assembly in accordance with an embodiment of the present invention.

As shown in the alternative cup assembly 210 of FIG. 3, there may be a diaphragm 246 that serves as a sidewall to the variable volume chamber 214' and displaces fluid in the chamber 214' and fluidically connected cavities. The diaphragm 246 may include one or more valves 244 that may vent air or other gases from the variable volume chamber 214' to or from the chamber 214 or outside the housing 212. The chamber 214 may be vented to the atmosphere. The valve 244 may have at least one air inlet and may have at least one air exhaust. The valve 244 may be a one-way valve so that air may come through the valve 244 in one direction, such as out of the variable volume chamber 214', or the valve 244 may selectively permit air to pass through in either direction. The air inlet may allow air to move through the diaphragm 246 out of the variable volume chamber 214', and the air exhaust may allow air to vent out of the chamber 214. The chamber 214 may vent freely with the atmosphere, or another valve may be necessary to permit gas in the chamber 214 to flow out of the assembly 210.

The cup assembly 210 of FIG. 3 has a variable volume chamber 214' that is defined on one side by the base 236 of the housing 212 adjacent to the vacuum cup 228 and the diaphragm 246 that is a flexible membrane extending across the chamber within the housing 212. Thus, the diaphragm 246 may serve as a sidewall to the variable volume chamber 214' as the piston 22 does in the embodiment of FIG. 1. It will be understood that many structures may form a sidewall of the variable volume chamber 214' and may substitute for the diaphragm 246, including without limitation a bellows or any other flexible membrane that may form a boundary to a variable volume fluid (gas or liquid) chamber. A bellows of sorts is shown and described in the embodiment of FIG. 7. Any sidewall that is moveable relative to the housing 212 and modifies the volume of the variable volume chamber 214' that is connected fluidically to the concave fluid chamber 228' in the vacuum cup 228.

Figure 4:
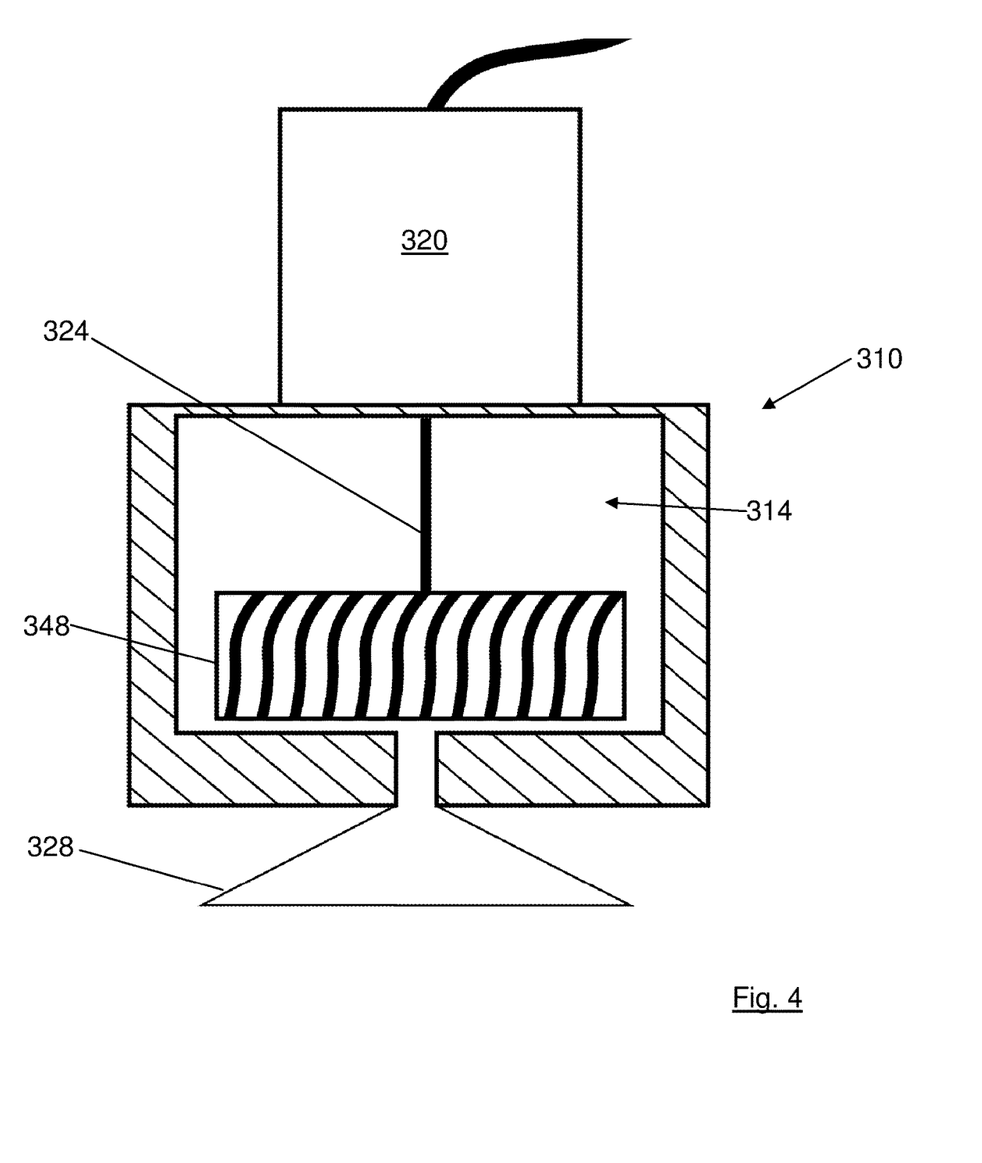
FIG. 4 is a cross-sectional view illustrating a vacuum cup assembly by using a fan in accordance with an embodiment of the present invention.

As shown in the alternative cup assembly 310 of FIG. 4 there may be a fan 348, such as a turbo fan, to remove air from the chamber 314. When the rotary motor 320 that has a driveshaft linkage 324 extending to the fan 348 is turned on, a negative pressure relative to atmospheric pressure outside of the assembly 310 may be created inside the vacuum cup 328 so that the vacuum cup 328 may have sufficient suction force to pick up a work piece.

Figure 5:
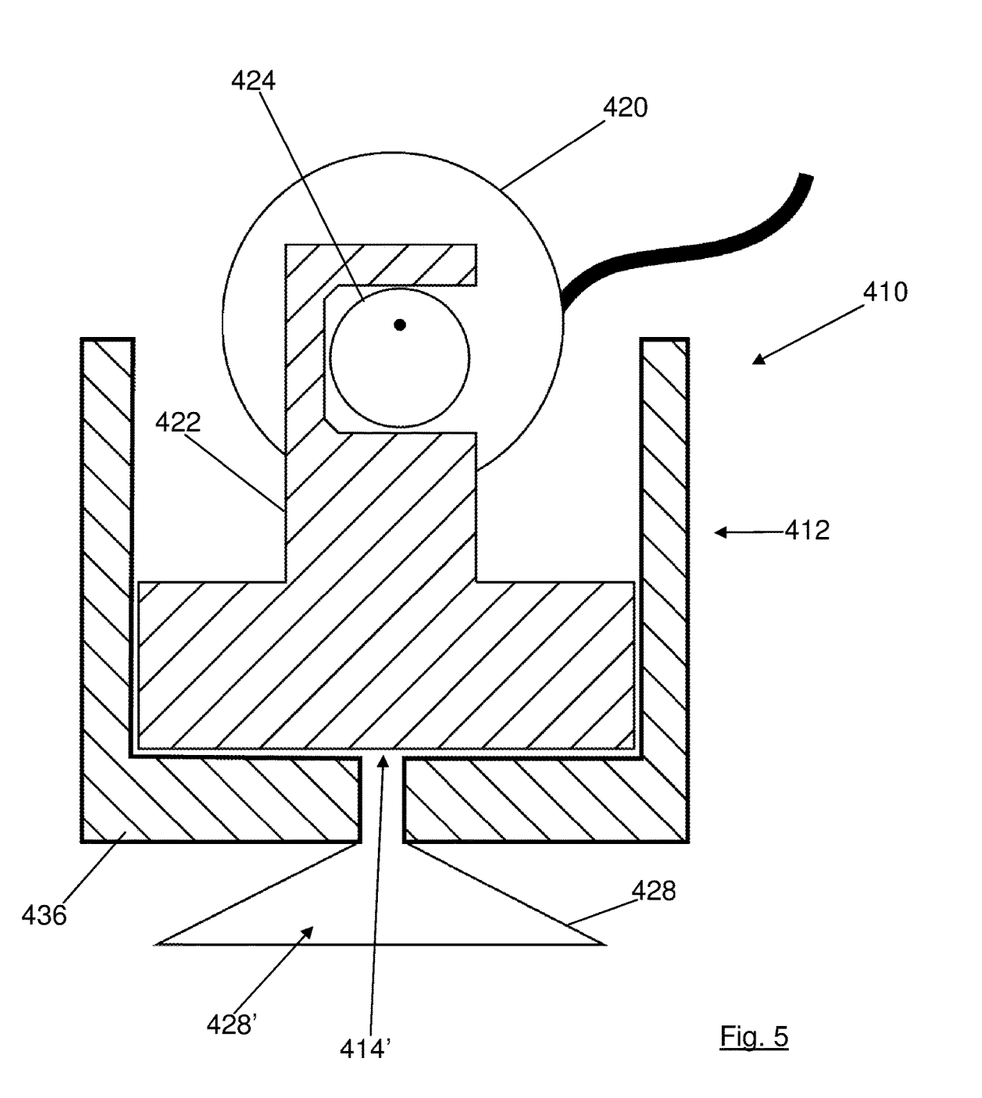
FIG. 5 is a cross-sectional view illustrating a vacuum cup assembly by using a cam in accordance with an embodiment of the present invention.

As shown in the alternative cup assembly 410 of FIG. 5, the electric motor 420 may be connected to the piston 422 via a driveshaft with an offset cam 424. The motor 420 may be mounted to the wall of the housing 412 and be adjacent the base 436 to which the vacuum cup 428 mounts. When the electric motor 420 is powered on, the cam 424 may be rotated, thereby causing the piston 422 to be displaced up and then down (in the orientation of FIG. 5) in the housing 412, depending upon the angle of rotation of the driveshaft. Moving the piston 422 upwardly enlarges the variable volume chamber 414' and draws fluid into the chamber 428' of the vacuum cup 428 and into the variable volume chamber 414', thereby creating suction and the temporary attachment of a work piece. Moving the piston 422 downwardly reduces the volume of the variable volume chamber 414' and forces fluid out of the variable volume chamber 414' into the chamber 428' of the vacuum cup 428, thereby releasing the work piece.

Continuous rotation of the driveshaft causes the piston 422 to reciprocate within the housing 412, which would simply pump fluid into and out of the variable volume valve 414' in the embodiment of FIG. 5. In such a situation, a valve system like that shown in FIG. 2 or FIG. 8 would cause such a piston 422 to draw fluid continuously into the chamber 428', then into the chamber 414', and then ventilate the variable volume chamber 414' into the atmosphere. The FIG. 8 embodiment is essentially the FIG. 5 embodiment with the addition of one or more valves.

Figure 6:
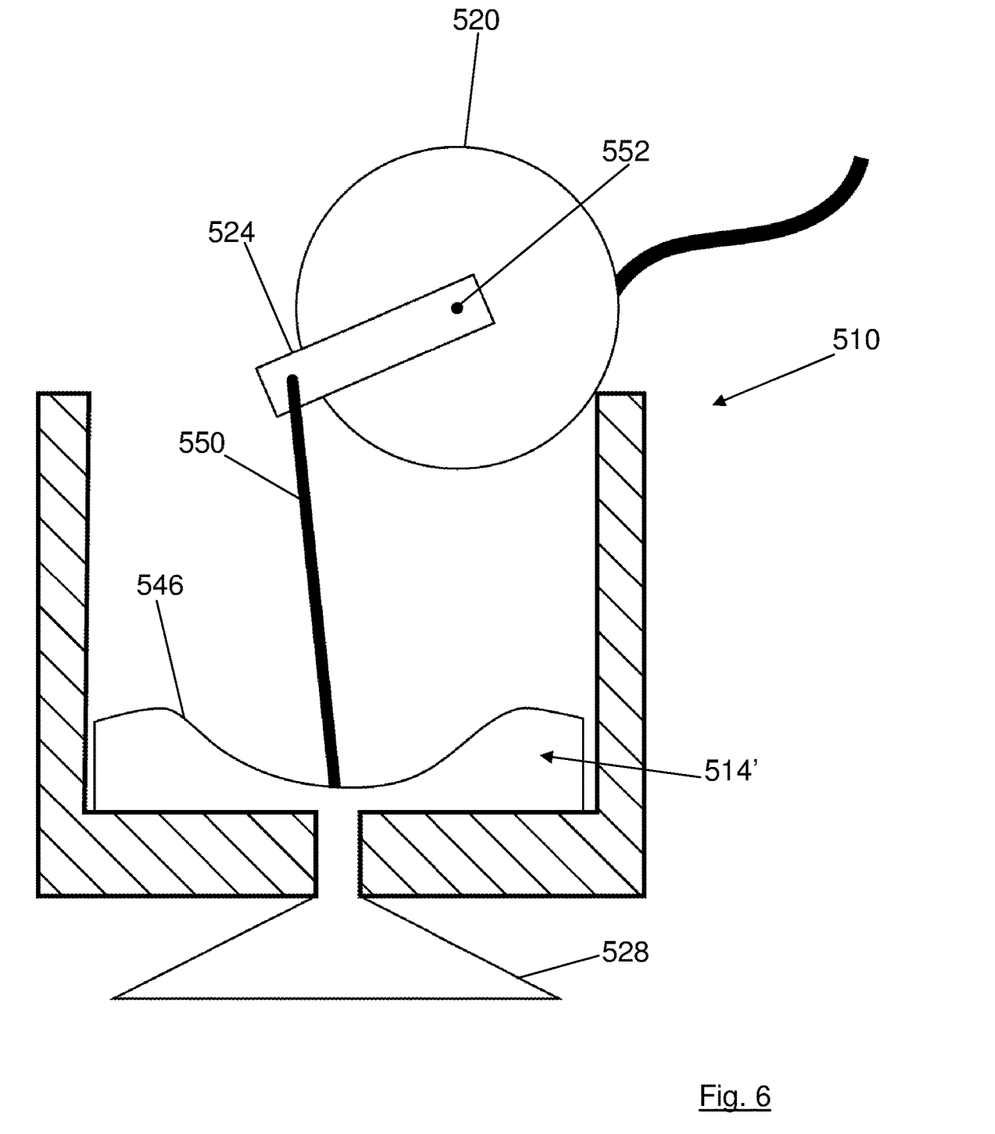
FIG. 6 is a cross-sectional view illustrating a vacuum cup assembly by using a lever in accordance with an embodiment of the present invention.

As shown in the alternative cup assembly 510 of FIG. 6, a linkage 524 may be formed between an electric motor 520 and a diaphragm 546, or any other sidewall to the variable volume chamber 514'. The linkage 524 may be a lever and a rod 550. There may be a slip clutch or other force-limiting structure between the motor 520 and the linkage 524. The slip clutch may be used to limit the torque applied to the linkage 524. In operation, when the electric motor 520 is turned on, the linkage 524 may pivot around an axis of the axle 552 as a circle. In turn, the diaphragm 546 may be displaced upwardly in the orientation of FIG. 6 to displace air in the chamber 514', thereby drawing fluid into the vacuum cup 528 due to negative pressure compared to the atmospheric air pressure. This creates sufficient suction force for the vacuum cup 528 to pick up a work piece. The linkage 524 may be replaced by a pulley, and the rod 550 may be replaced by a string, cable, chain, or belt, for example. In operation of such an alternative, when the motor 520 is turned on, the pulley winds up the cable, thus pulling the piston or diaphragm 546 and enlarging the variable volume chamber 514'. It is contemplated that the motor 520 may be a rotary solenoid.

Figure 7:
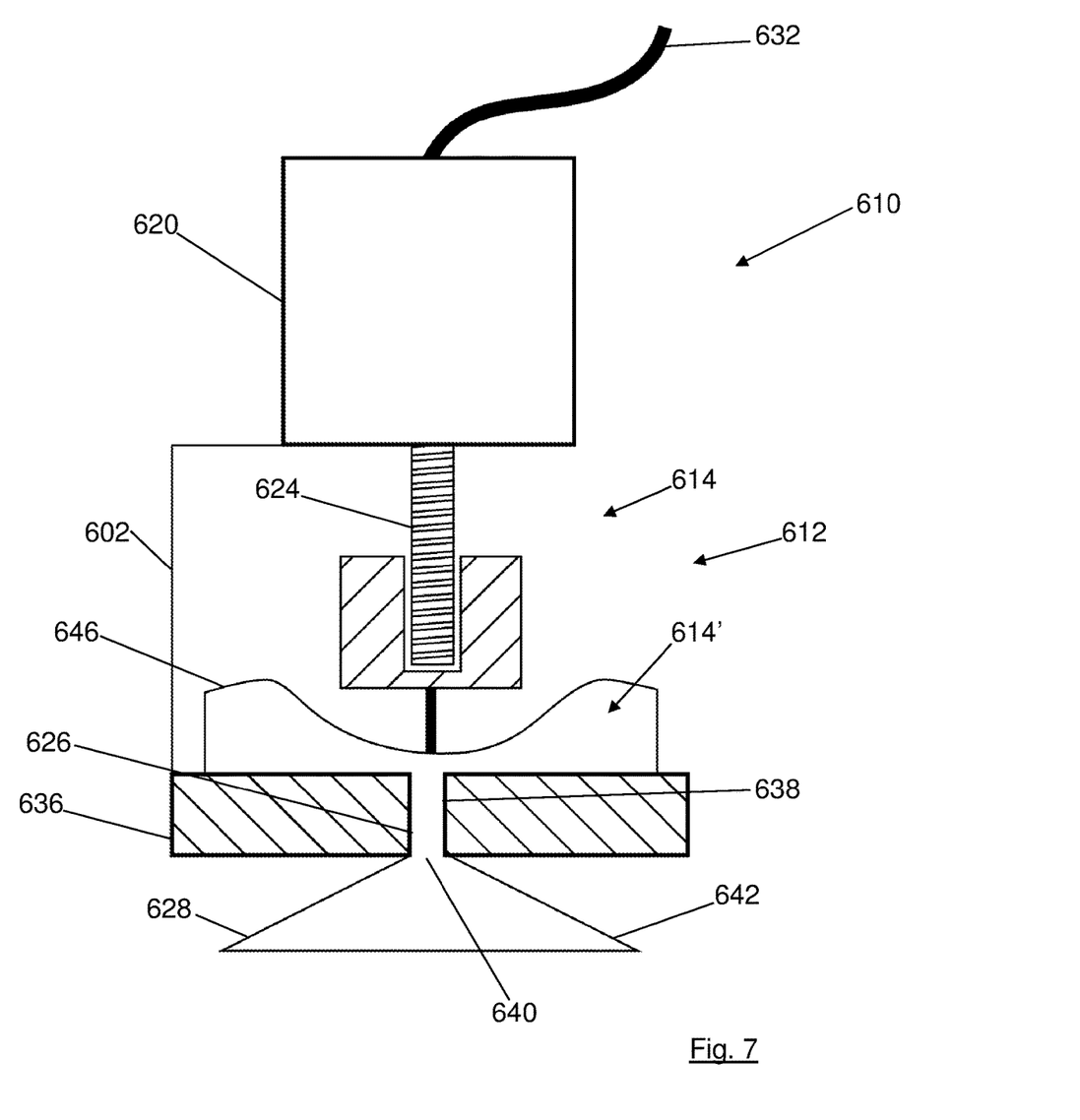
FIG. 7 is a cross-sectional view illustrating a vacuum cup assembly in accordance with an embodiment of the present invention.

Referring to FIG. 7, a vacuum cup assembly 610 may include a housing 612, which consists of a plate 636 to which a frame member 602 is mounted, thereby forming a chamber 614 that is open to the atmosphere. An electrical motor or solenoid 620 mounts to the housing 612 via the frame member 602, to drive a diaphragm 646. The housing 612 may have a base 636 and a housing aperture 638 in the base 636, and the motor or solenoid 620 may be mounted to the base 636, the frame member 602 or any other solid structure. Thus, the motor or solenoid 620 is not limited in where it can be positioned. A tubing 626 and a vacuum cup 628 with a cup aperture 640 may be connected to the housing 612 at the housing aperture 638. The cup aperture 640 may be at the top, in the orientation of FIG. 7, of the vacuum cup 628. The cup aperture 640 may alternatively be disposed in the wall 642 of the vacuum cup 628.

The vacuum cup assembly 610 may further include a linkage 624, such as a threaded shaft, a rigid rod, or a rack and pinion, connecting the electric motor or solenoid 620 to the diaphragm 646. The linkage 624 may include a spring that urges the diaphragm 646 downwardly or upwardly in the orientation of FIG. 7. The solenoid 620 may include an electric connector 632 electrically connected to an AC or DC electrical source, which may be located on the assembly 610. The vacuum cup 628 may have a deformable, flexible wall 642 that permits the vacuum cup 628 to readily pick up a work piece at one location and move the work piece to another location. The vacuum cup 628 may be made of silicone, rubber, or polymers, for example, so that the body of the vacuum cup 628 is flexible, yet sturdy to hold up a work piece for a period of time.

In operation, the electric motor or solenoid 620 is powered on and the diaphragm 646 may be moved downwardly to displace air in the variable volume chamber 614' that is defined by the housing 612 and the diaphragm 646. The solenoid 620 may then displace the diaphragm 646 upwardly to create negative pressure in the vacuum cup 628 relative to atmospheric pressure. Because the negative pressure exists in the vacuum cup 628, the lower rim of the vacuum cup 628 may create a suction force sufficient to pick up a work piece. Valves like those shown in FIGS. 2, 3 and 8 may be mounted in the diaphragm 646, the housing 612 or elsewhere to selectively ventilate the variable volume chamber 614' to the atmosphere to release a work piece. The valves may be controlled by a computer to selectively permit the passage of air into the variable volume chamber 614' or out of the variable volume chamber 614'.

Figure 10:
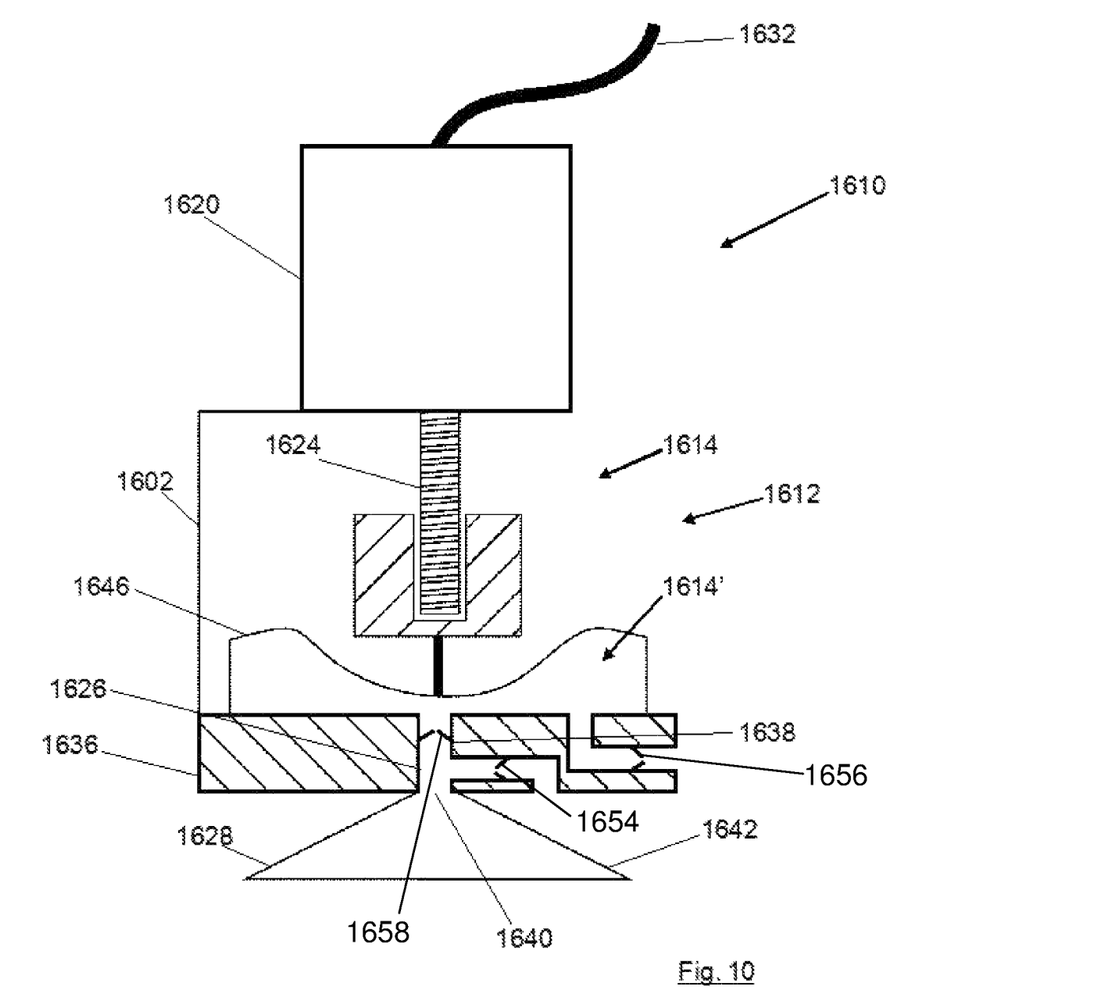
FIG. 10 is a cross-sectional view illustrating a vacuum cup assembly in accordance with an embodiment of the present invention.

Referring to FIG. 10, a vacuum cup assembly 1610 may include a housing 1612, which consists of a plate 1636 to which a frame member 1602 is mounted, thereby forming a chamber 1614 that is open to the atmosphere. An electrical motor 1620 mounts to the housing 1612 via the frame member 1602, to drive a diaphragm 1646. The housing 1612 may have a base 1636 and a housing aperture 1638 in the base 1636, and the motor 1620 may be mounted to the base 1636, the frame member 1602 or any other solid structure. Thus, the motor 1620 is not limited in where it can be positioned. A tubing 1626 and a vacuum cup 1628 with a cup aperture 1640 may be connected to the housing 1612 at the housing aperture 1638. The cup aperture 1640 may be at the top, in the orientation of FIG. 10, of the vacuum cup 1628. The cup aperture 1640 may alternatively be disposed in the wall 1642 of the vacuum cup 1628.

The vacuum cup assembly 1610 may further include a linkage 1624, such as a threaded shaft, a rigid rod, or a rack and pinion, connecting the electric motor 1620 to the diaphragm 1646. The linkage 1624 may include a spring that urges the diaphragm 1646 downwardly or upwardly in the orientation of FIG. 10. The motor 1620 may include an electric connector 1632 electrically connected to an AC or DC electrical source, which may be located on the assembly 1610. The vacuum cup 1628 may have a deformable, flexible wall 1642 that permits the vacuum cup 1628 to readily pick up a work piece at one location and move the work piece to another location. The vacuum cup 1628 may be made of silicone, rubber, or polymers, for example, so that the body of the vacuum cup 1628 is flexible, yet sturdy to hold up a work piece for a period of time.

In operation, the electric motor 1620 is powered on and the diaphragm 1646 may be moved downwardly to displace air in the variable volume chamber 1614' that is defined by the housing 1612 and the diaphragm 1646. The electric motor 1620 may then displace the diaphragm 1646 upwardly to create negative pressure in the vacuum cup 1628 relative to atmospheric pressure. Because the negative pressure exists in the vacuum cup 1628, the lower rim of the vacuum cup 1628 may create a suction force sufficient to pick up a work piece. Valves 1654, 1656 and 1658 like those shown in FIGS. 2, 3 and 8 may be mounted in the diaphragm 1646, the housing 1612 or elsewhere to selectively ventilate the variable volume chamber 1614' to the atmosphere to release a work piece. The valves 1654, 1656 and 1658 may be controlled by a computer to selectively permit the passage of air into the variable volume chamber 1614' or out of the variable volume chamber 1614'.

As shown in the alternative cup assembly 710 of FIG. 8, the electric motor 720 may be connected to the piston 722 via a driveshaft with an offset cam 724. When the electric motor 720 is powered on, such as through an electrical connector 732, the cam 724 may be rotated causing the piston 722 to be displaced up and then down (in the orientation of FIG. 8) in the housing 712, depending upon the angle of rotation of the driveshaft. Moving the piston 722 upwardly enlarges the variable volume chamber 714' and draws fluid into the chamber 728' of the vacuum cup 728, which creates suction at the vacuum cup 728, and moving the piston 722 downwardly releases the work piece. Continuous rotation of the driveshaft causes the piston 722 to reciprocate up and down cyclically within the housing 712, and the valves 754, 756 and 758 shown in FIG. 8 cause fluid to be drawn continuously into the chamber 728' and into the variable volume chamber 714'. The series of valves 754, 756 and 758 may permit gas to flow into the variable volume chamber 714' during piston 722 reciprocation, and prevent gas from moving out of the variable volume chamber 714' through the valves 754, 756 and 758. Alternatively, the valves 754, 756 and 758 may be computer-actuated to open and close. The motor 720 may be operated at all times during use of the assembly 710 and gas will flow from the chamber 728' in the vacuum cup 728 into the variable volume chamber 714'. One or more of the valves 754, 756 and 758 may be manually or automatically (such as by a computer controlling operation according to a computer program) operated to permit gas flow in the opposite direction at some times in order that little to no suction is generated in the vacuum cup 728. This may be desirable for continuous operation of the motor 720 to generate suction at only times when the more readily controlled valves 754, 756 and 758 are configured to permit such suction. In this way, the valves 754, 756 and 758 may permit regulation of suction on the assembly 710, rather than using the operation of the motor 720 to regulate suction. By controlling one or more of the valves 754, 756 and 758, this may allow one to attempt to attach to a work piece multiple times, because while the motor 720 continues to rotate the valves 754, 756 and 758 may be controlled to control the flow of gas and provide continuous suction through the cup 728 and prevent damage to the work piece or any other structure. The invention thus permits one to pick up a porous work piece by continuously drawing gas that is pulled through the porous work piece.

Figure 9:
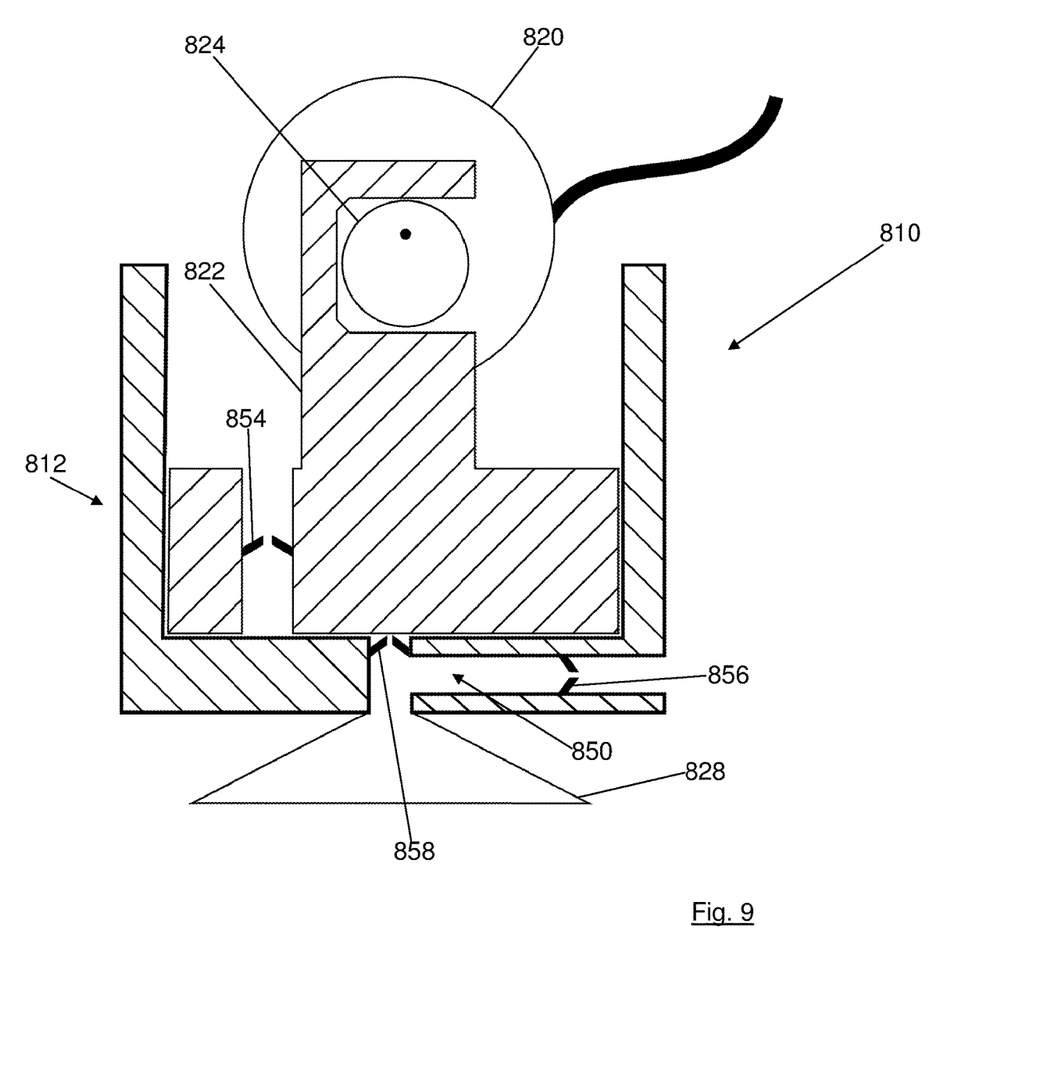
FIG. 9 is a cross-sectional view illustrating a vacuum cup assembly in accordance with an embodiment of the present invention.

As shown in the alternative cup assembly 810 of FIG. 9, the electric motor 820 may be connected to the piston 822 via a driveshaft with an offset cam 824. When the electric motor 820 is powered on, the cam 824 may be rotated causing the piston 822 to be displaced up and then down (in the orientation of FIG. 9) in the housing 812, depending upon the angle of rotation of the driveshaft. Moving the piston 822 upwardly enlarges the variable volume chamber and draws fluid into the chamber of the vacuum cup 828, which creates suction at the vacuum cup 828, and moving the piston 822 downwardly releases the work piece. It should be noted that selective actuation of the valve 856 in the passage 850 also releases the work piece by ventilating the negative pressure in the vacuum cup 828. The valve 854 extends through the piston 822, and the valve 858 extends through the housing 812.

It is contemplated that the housing of any of the embodiments herein described could be extended by a tube that mounts to the housing near the variable volume chamber and extends to the vacuum cup. This may be desirable in the case of a suction cup that will temporarily mount to the inside of a workpiece, such as a box or can, which has sidewalls that prevent attachment without the extension of the housing that the tube is.

It should be understood, of course, that the foregoing relate to exemplary embodiments of the invention and that modifications may be made without departing from the spirit and scope of the invention as set forth in the following claims.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A vacuum cup assembly comprising:
   (a) a vacuum cup having a wall terminating at one end in a rim configured to seat against a work piece for forming a temporary attachment to the work piece, the vacuum cup having a concave fluid chamber formed within the vacuum cup wall;
   (b) a housing having a wall to which the vacuum cup is mounted, the housing at least partially defining a variable volume chamber that is fluidically connected to the concave fluid chamber;
   (c) a flexible membrane sealingly mounted to the housing wall and partially defining the variable volume chamber; and
   (d) a prime mover mounted to the housing and the flexible membrane, the prime mover being operable to selectively displace the flexible membrane relative to the housing, thereby modifying the volume of the variable volume chamber and modifying the fluid pressure in the concave fluid chamber.

2. The vacuum cup assembly in accordance with claim 1, further comprising at least one valve disposed in a fluid connection between the concave fluid chamber and atmosphere configured to cause a pressure in the concave fluid chamber to change closer to atmospheric pressure.

3. The vacuum cup assembly in accordance with claim 1, further comprising at least one valve mounted in the flexible membrane to permit fluid to flow through said at least one valve from the variable volume chamber.

4. The vacuum cup assembly in accordance with claim 1, further comprising at least one valve mounted in the housing to permit fluid to flow through said at least one valve from the variable volume chamber.

5. The vacuum cup assembly in accordance with claim 4, wherein said at least one valve has at least one air inlet.

6. The vacuum cup assembly in accordance with claim 4, wherein said at least one valve has at least one air exhaust.

7. The vacuum cup assembly in accordance with claim 4, wherein said at least one valve in the housing and said at least one valve in the flexible membrane are electrically controlled.

8. The vacuum cup assembly in accordance with claim 1, further comprising a housing fluid passage formed through the wall of the housing and in fluid communication with a cup fluid passage formed through the wall of the vacuum cup, the housing fluid passage and the cup fluid passage defining a continuous fluid passage between the variable volume chamber and the concave fluid chamber.

9. The vacuum cup assembly in accordance with claim 1, wherein the prime mover is drivingly linked to the flexible membrane and configured for reciprocation of the flexible membrane in opposing directions.

10. The vacuum cup assembly in accordance with claim 1, wherein the prime mover is drivingly linked to the flexible membrane.

11. The vacuum cup assembly in accordance with claim 10, wherein the prime mover further comprises a rotary motor having a threaded driveshaft extending to the flexible membrane.

12. The vacuum cup assembly in accordance with claim 10, wherein the prime mover further comprises a linear motor having a rod extending to the flexible membrane.

13. The vacuum cup assembly in accordance with claim 10, wherein the prime mover further comprises a rotary motor drivingly linked to the flexible membrane.

14. The vacuum cup assembly in accordance with claim 10, wherein the prime mover is an electrical motor.

15. The vacuum cup assembly in accordance with claim 10, wherein the prime mover is a solenoid.

16. The vacuum cup assembly in accordance with claim 1, wherein the vacuum cup has a deformable flexible wall.

17. The vacuum cup assembly in accordance with claim 1, further comprising at least one sensor.

18. The vacuum cup assembly in accordance with claim 17, wherein said at least one sensor measures pressure.

19. The vacuum cup assembly in accordance with claim 17, wherein said at least one sensor detects the flexible membrane location in the chamber.

20. A vacuum cup assembly comprising:
   (a) a vacuum cup having a wall terminating at one end in a rim configured to seat against a work piece for forming a temporary attachment to the work piece, the vacuum cup having a concave fluid chamber formed within the vacuum cup wall;
   (b) a housing having a wall to which the vacuum cup is mounted, the housing at least partially defining a variable volume chamber that is fluidically connected to the concave fluid chamber, wherein the housing has at least one fluid passage between the variable volume chamber and atmosphere and said at least one fluid passage has at least one valve that permits fluid to flow therethrough;
   (c) a flexible membrane sealingly mounted to the housing wall and partially defining the variable volume chamber; and
   (d) a rotary motor drivingly linked to the housing and the flexible membrane, the motor being operable to selectively displace the flexible membrane relative to the housing, thereby modifying the volume of the variable volume chamber and modifying the fluid pressure in the concave fluid chamber.

* * * * *